United States Patent
Shibata et al.

(10) Patent No.: US 7,882,962 B2
(45) Date of Patent: Feb. 8, 2011

(54) HYDROPHILIZING AGENT FOR HYDROPHOBIC POROUS MEMBRANE, AND METHOD FOR HYDROPHILIZING HYDROPHOBIC POROUS MEMBRANE AND TEST METHOD USING THIS AGENT

(75) Inventors: Noritaka Shibata, Toyohashi (JP); Makoto Ideguchi, Minato-ku (JP); Wataru Fujii, Minato-ku (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 483 days.

(21) Appl. No.: 11/798,004

(22) Filed: May 9, 2007

(65) Prior Publication Data

US 2007/0209425 A1    Sep. 13, 2007

Related U.S. Application Data

(63) Continuation of application No. PCT/JP2005/020518, filed on Nov. 9, 2005.

(30) Foreign Application Priority Data

Nov. 10, 2004   (JP)   ............................ 2004-326725

(51) Int. Cl.
*B01D 71/00*   (2006.01)
*B05D 5/00*    (2006.01)

(52) U.S. Cl. ............. 210/500.21; 427/246; 210/500.36; 210/502.1; 210/500.27

(58) Field of Classification Search .................. None
See application file for complete search history.

(56) References Cited

U.S. PATENT DOCUMENTS

| 4,399,035 A | * | 8/1983 | Nohmi et al. ........... 210/500.23 |
| 4,525,374 A | * | 6/1985 | Vaillancourt ................. 427/2.3 |
| 4,675,213 A | | 6/1987 | Yamamori et al. |
| 5,209,850 A | * | 5/1993 | Abayasekara et al. .. 210/500.36 |
| 5,650,543 A | * | 7/1997 | Medina ....................... 568/616 |
| 6,635,103 B2 | | 10/2003 | Sirkar et al. |
| 2003/0226473 A1 | | 12/2003 | Ishimoto |

FOREIGN PATENT DOCUMENTS

| CN | 1471425 A | 1/2004 |
| CN | 1126716 A | 7/2007 |
| GB | 2386377 | 9/2003 |
| JP | 63-277251 A | 11/1988 |
| JP | 01-119310 A | 5/1989 |
| JP | 04-118033 A | 4/1992 |
| JP | 08-020663 A | 1/1996 |

* cited by examiner

*Primary Examiner*—Krishnan S Menon
(74) *Attorney, Agent, or Firm*—Fitch, Even, Tabin & Flannery

(57) ABSTRACT

A hydrophilizing agent for a hydrophobic porous membrane, wherein the agent contains a surfactant, and the surfactant has a frothability such that the bubble height immediately after frothing, as measured according to the Ross-Miles method (JIS K 3362), using a 0.1 wt % aqueous solution of the surfactant at 25° C., is 40 mm or less, and preferably has a frothability such that the bubble height five minutes after frothing is 20 mm or less; a method for hydrophilizing a hydrophobic porous membrane using this hydrophilizing agent; and a method for testing and hydrophilizing a membrane module using this hydrophilizing agent.

7 Claims, 1 Drawing Sheet

HYDROPHILIZING AGENT FOR HYDROPHOBIC POROUS MEMBRANE, AND METHOD FOR HYDROPHILIZING HYDROPHOBIC POROUS MEMBRANE AND TEST METHOD USING THIS AGENT

This application is a continuation application of prior application number PCT/JP2005/020518, filed Nov. 9, 2005, and claims foreign priority from Japanese Patent Application No. 2004-326725 filed on Nov. 10, 2004, the complete disclosures of which are hereby incorporated herein by reference in their entireties.)

TECHNICAL FIELD

This invention relates to a hydrophilizing agent that is used for a hydrophobic porous membrane and contains a low-frothing surfactant, and more particularly relates to the use of the above-mentioned hydrophobic porous membrane in the hydrophilization treatment of a hydrophobic porous membrane, such as a microfiltration membrane or an ultrafiltration membrane.

BACKGROUND ART

Porous membranes, such as microfiltration membranes or ultrafiltration membranes, have been used in a wide range of fields for such purposes as treating industrial waste and other such sludge substances, and sterilizing pharmaceutical water. Membranes used for these purposes can be broadly divided into hydrophobic porous membranes and hydrophilic porous membranes, and in the field of solid-liquid separation, hydrophobic porous membranes are preferable because of their chemical resistance, fouling resistance, weather resistance, resistance to degradation by oxidation, and so forth. However, water or an aqueous solution cannot pass through the pores of a hydrophobic porous membrane because of the hydrophobic nature of the membrane, or considerable pressure must be applied even if such passage is possible. Therefore, hydrophobic porous membranes are subjected to a hydrophilization treatment ahead of time so that water or an aqueous solution can pass through more easily. This hydrophilization treatment is necessary not only when a hydrophobic porous membrane is to be used for the first time after its manufacture, but also whenever all or part of the membrane dries out through contact with air during the inspection or cleaning of the membrane or during an extended shut-down of operation. The appropriate hydrophilization of a hydrophobic porous membrane is particularly important with a membrane composed of a polymer that is highly hydrophobic, such as a fluororesin, because there is a pronounced decrease in liquid permeability once the membrane is dried.

Examples of known methods for hydrophilizing a hydrophobic porous membrane include a method in which hydrophilic groups are introduced into the membrane itself (Japanese Laid-Open Patent Application H6-296686), as well as treating the membrane with deaerated water (Japanese Laid-Open Patent Application H5-208121), alcohol (Japanese Laid-Open Patent Application S58-96633), glycerol (Japanese Laid-Open Patent Application 2002-95939), or an inorganic salt (Japanese Laid-Open Patent Application H6-277470).

However, with a method in which hydrophilic groups are introduced into the membrane itself (Japanese Laid-Open Patent Application H6-296686), the membrane has to be thoroughly washed with a cleaning liquid, such as a large amount of water, to remove any of the monomer constituting the hydrophilic groups that remains unreacted on the membrane. With a method in which the membrane is treated with deaerated water (Japanese Laid-Open Patent Application H5-208121), deaerated water essentially has to be pressurized and passed through the membrane, so this treatment method is complicated. Furthermore, since the hydrophilized membrane must be kept moist at all times, a module containing the hydrophilized membrane has to be transported, shipping, sold, and so forth in a state of being filled with moisturizing liquid or the like, which means that it handling is inconvenient. With a method in which the membrane is treated with alcohol or the like (Japanese Laid-Open Patent Applications S58-96633, etc.), the alcohol or other substance used for the treatment remains in the hydrophobic porous membrane, so the membrane has to be thoroughly washed with a large amount of cleaning liquid at the time of its use.

Also, a method in which a specific process is employed to treat a membrane with a surfactant has been disclosed as another hydrophilization treatment method for a hydrophobic porous membrane (Japanese Laid-Open Patent Application H1-119310).

Japanese Laid-Open Patent Application H1-119310, however, is employed the specific process to reduce the amount of surfactant used and thereby minimize a drawback of elution on the basis that there is the drawback in that when a membrane is treated with a surfactant, some of the surfactant remains behind and is gradually eluted into the treated water. In other words, Japanese Laid-Open Patent Application H1-119310 merely involves reducing the amount of surfactant used and thereby reducing the amount of surfactant that is eluted, and does not solve the fundamental problem of surfactant elution.

DISCLOSURE OF THE INVENTION

It is a first object of the present invention to provide a hydrophilizing agent that is suited to hydrophilizing a hydrophobic porous membrane, and a hydrophilization method in which this hydrophilizing agent is used.

It is a second object of the present invention to provide a hydrophilizing agent for hydrophilizing a hydrophobic porous membrane, with which the amount of hydrophilizing agent remaining after the treatment of a hydrophobic porous membrane is dramatically reduced, and a hydrophilization method in which this hydrophilizing agent is used.

It is a third object of the present invention to provide a method for testing a membrane module, with which bubbles generated in a hydrophilizing agent during testing for leaks, defects, clogging, or the like of the membrane module can be favorably suppressed, with the membrane module containing a hydrophobic porous membrane and being immersed in the hydrophilizing agent.

It is a fourth object of the present invention to provide a favorable method for hydrophilizing a membrane module containing a hydrophobic porous membrane and disposed in a membrane separation tank containing a solution to be treated (treatment liquid) and equipped with an aeration apparatus, while the membrane module is still immersed in the treatment liquid.

As a result of diligent study aimed at solving the above problems, the inventors arrived at the present invention upon discovering that these problems could be solved by using a specific low-frothing surfactant having a defoaming property and low surface tension.

Specifically, the present invention relates to:

1. A hydrophilizing agent for a hydrophobic porous membrane, wherein the agent contains a surfactant, and the surfactant has a frothability such that the bubble height immediately after frothing, as measured according to the Ross-Miles method (JIS K 3362), using a 0.1 wt % aqueous solution of the surfactant at 25° C., is 40 mm or less.

2. The hydrophilizing agent for a hydrophobic porous membrane according to 1 above, wherein the surfactant has a frothability such that the bubble height five minutes after frothing, as measured according to the Ross-Miles method (JIS K 3362), using a 0.1 wt % aqueous solution of the surfactant at 25° C., is 20 mm or less.

3. The hydrophilizing agent for a hydrophobic porous membrane according to 1 or 2 above, wherein the surfactant has a static surface tension of 30 mN/m or less when a 0.1 wt % aqueous solution of the surfactant is used.

4. The hydrophilizing agent for a hydrophobic porous membrane according to any of 1 to 3 above, wherein the surfactant is acetylene glycol, ethoxylated acetylene glycol, or a mixture of these.

5. A method for hydrophilizing a hydrophobic porous membrane, comprising a step of bringing a hydrophobic porous membrane into contact with the hydrophilizing agent for a hydrophobic porous membrane according to any of 1 to 4 above.

6. The method for hydrophilizing a hydrophobic porous membrane according to 5 above, further comprising a step of drying the hydrophobic porous membrane that has come into contact with the hydrophilizing agent for a hydrophobic porous membrane according to any of 1 to 4 above.

7. A method for testing a membrane module having a main body, an inlet and outlet provided to the main body, and a hydrophobic porous membrane provided inside the main body, the method comprising the steps of:

(1) immersing the membrane module in the hydrophilizing agent for a hydrophobic porous membrane according to any of 1 to 4 above;

(2) introducing a test gas through the inlet, allowing the gas to pass through the hydrophobic porous membrane, and discharging the gas through the outlet; and (3) observing bubbles discharged from the membrane module.

8. A method for testing and hydrophilizing a membrane module having a main body, an inlet and outlet provided to the main body, and a hydrophobic porous membrane provided inside the main body, the method comprising the steps of:

(1) immersing the membrane module in the hydrophilizing agent for a hydrophobic porous membrane according to any of 1 to 4 above;

(2) introducing a test gas through the inlet, allowing the gas to pass through the hydrophobic porous membrane, and discharging the gas through the outlet;

(3) observing bubbles discharged from the membrane module; and (4) drying the membrane module.

By immersing a membrane that is highly hydrophobic, such as a fluorine-based separation membrane, for a specific time in the low-frothing surfactant of the present invention and then drying the membrane, this separation membrane can be stored stably in a dry state without degrading for an extended period, and when this separation membrane is to be used, it can be spontaneously and completely moistened with water, which means that dry storage is facilitated, and an excellent hydrophobic porous membrane that needs no pretreatment at the time of its use can be provided.

Also, with the method of the present invention for hydrophilizing a hydrophobic porous membrane, a porous membrane that has been dried and become hydrophobic can be restored to good liquid permeability in easily, smoothly, and inexpensively, in a short time, with little labor, and using a small amount of chemicals, all of which is extremely advantageous for industrial purposes.

Figure 1:
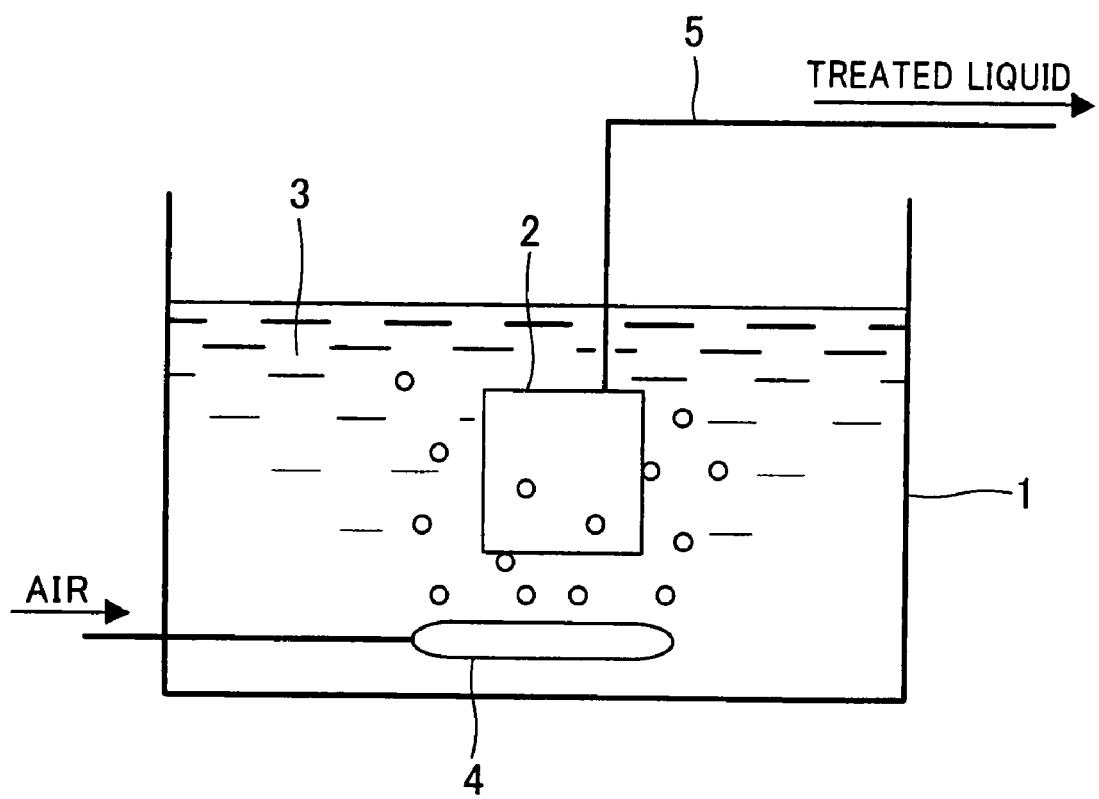
FIG. 1 is a schematic drawing of a preferred example for working the method of the present invention for hydrophilizing a membrane.

BEST MODE FOR CARRYING OUT THE INVENTION (1) Hydrophilizing Agent for a Hydrophobic Porous Membrane The hydrophilizing agent for a hydrophobic porous membrane of the present invention contains a low-frothing surfactant and any solvent and any additives desired.

(1-1) Surfactant

The surfactant of the present invention has low frothability. The frothability can be measured according to the Ross-Miles method (JIS K 3362). For instance, a 0.1 wt % aqueous solution of surfactant was frothed at 25° C. using an apparatus conforming to the froth strength measurement apparatus set forth in JIS K 3362, and the bubble height immediately after frothing and the bubble height five minutes after frothing were measured according to the Ross-Miles method (JIS K 3362). The Ross-Miles method mentioned here involves putting 50 mL of a surfactant aqueous solution in a glass cylinder with an inside diameter of 50 mm, dropping 200 mL of surfactant aqueous solution on top of this from a height of 90 cm for 30 seconds, and measuring the bubble height (mm) immediately after dropping and after a specific time has elapsed. It is favorable for the surfactant of the present invention to be such that the bubble height immediately after frothing, as measured by the above-mentioned Ross-Miles method, is 40 mm or less, and preferably 30 mm or less, and even more preferably 20 mm or less. 40 mm or less is favorable because foaming by the surfactant can be kept low.

Also, it is favorable for the surfactant of the present invention to be such that the bubble height five minutes after frothing, as measured by the above-mentioned Ross-Miles method (JIS K 3362), is 20 mm or less, and preferably 15 mm or less, and even more preferably 0 to 10 mm. 20 mm or less is favorable because foaming by the surfactant can be kept low.

The surfactant used in the present invention preferably has a static surface tension of 29 mN/m or less when a 0.1 wt % aqueous solution of the surfactant is used. Even more preferable is 28 mN/m or less, with a range of 20 to 28 mN/m being better yet. The static surface tension here can be measured with a CBVP-Z Automatic Surface Tensiometer (made by Kyowa Interface Science) that features the JIS Wilhelmy (plate) method. It is preferable for the static surface tension to be 30 mN/m or less because the hydrophilization of the hydrophobic porous membrane will tend to take less time.

Also, the surfactant used in the present invention preferably has a dynamic surface tension (room temperature) of 50 mN/m or less when a 0.1 wt % aqueous solution of the surfactant is used. Even more preferable is a range of 10 to 50 mN/m, with 25 to 40 mN/m being better yet. The dynamic surface tension can be measured from the values obtained at 1 Hz and 10 Hz for a 0.1 wt % aqueous solution, using a Bubble Pressure Dynamic Bubble Pressure Tensiometer, Krüss BP-2 (made by Krüss), for example.

Surfactants that can be used in the present invention can be selected from among anionic surfactants, cationic surfactants, amphoteric surfactants, and nonionic surfactants. A nonionic surfactant is particularly favorable from the standpoints of foaming and frothing.

Specific examples of nonionic surfactants include acetylene glycol-based surfactants, acetylene alcohol-based surfactants, polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, polyoxyalkylene alkyl ether, and other such ether-based surfactants, polyoxyethylene oleic acid, polyoxyethylene oleic acid esters, polyoxyethylene distearic acid esters, sorbitan laurate, sorbitan monostearate, sorbitan monooleate, sorbitan sesquioleate, polyoxyethylene monooleate, polyoxyethylene stearate, and other such ester-based surfactants, dimethylpolysiloxane and other such silicon-based surfactants, and fluoroalkyl esters, perfluoroalkyl carboxylates, and other such fluorine-containing surfactants.

Of the above-mentioned nonionic surfactants, acetylene glycol-based surfactants are particularly favorable because of their excellent wettability, permeability, and defoaming property. In addition, an acetylene glycol surfactant is a relatively stable substance, and will not undergo biodegradation even when a membrane is stored for an extended period. Another characteristic of an acetylene glycol surfactant is its high permeability, and particularly its low dynamic surface tension. Accordingly, it can be used favorably in the hydrophilization treatment of a relatively thick hollow fiber membrane, and treatment can be completed in a short time, among other benefits.

Specific examples of acetylene glycol surfactants include 2,4,7,9-tetramethyl-5-decyn-4,7-diol, 3,6-dimethyl-4-octyn-3,6-diol, 3,5-dimethyl-1-hexyn-3-ol, 2,5,8,11-tetramethyl-6-dodecyn-5,8-diol, and ethoxylates of these.

One or more of these can be suitably selected as dictated by the situation, but of these, it is preferable to use one of the above-mentioned ethoxylates in which the total number of added moles of ethylene oxide is between 2 and 30. A range of 4 to 12 moles is even better. Keeping the total number of added moles of ethylene oxide to 30 or less lowers the static and dynamic surface tension, and the product can be used favorably as a hydrophilizing agent.

Acetylene glycol surfactants and ethoxylates thereof can also be purchased as commercially available products, examples of which include Surfynol 104, 82, 465, 485, and TG made by Air Products, and Olfine STG, Olfine E1010, Olfine EXP4036, and Olfine PD-001 made by Nissin Chemical Industry.

For example, Olfine EXP4036 (made by Nissin Chemical Industry), which is a type of acetylene glycol surfactant, has a static surface tension of 30 mN/m or less at 0.1 wt %. Olfine PD-001 and Olfine STG (both made by Nissin Chemical Industry) similarly have a static surface tension of 30 mN/m or less at 0.1 wt %. Thus, an acetylene glycol surfactant can exhibit good hydrophilicity at an extremely low concentration.

(1-2) Solvent

Water, physiological saline or another aqueous solution containing an electrolyte, ethanol, methanol, or another $C_1$ to $C_4$, and preferably $C_1$ or $C_2$, lower alcohol, pyridine, chloroform, cyclohexane, ethyl acetate, toluene, or a mixture of these can be used as a solvent for dissolving the surfactant of the present invention. The use of water is particularly favorable from the standpoints of the effect on the materials used to perform the hydrophilization treatment, post-treatment of the solvent, safety, cost, and so forth. It is especially good for the water that is used to be ordinary tap water or deionized water that has been filtered through a hollow fiber membrane with a pore size of 0.01 to 1 μm.

(1-3) Additives

Additives can optionally be added to the hydrophilizing agent for a hydrophobic porous membrane of the present invention. Examples of additives that can be used include surfactants other than the above-mentioned one, and glycerol.

For example, ethylene oxide or propylene oxide, or a mixture of these, or a block polymer thereof (such as Epan 750 made by Dai-ichi Kogyo Seiyaku), can be used for the purpose of increasing the water solubility of the surfactant used in the present invention.

These additives can be used to the extent that they do not compromise the characteristics of the hydrophilizing agent of the present invention. For instance, they can be used in an amount of 5 to 90 wt %, and preferably 5 to 50 wt %, with respect to the entire hydrophilizing agent. Furthermore, pure water or a water-soluble organic solvent can be used to the extent that it does not compromise the characteristics of the hydrophilizing agent of the present invention, and can be used, for example, in an amount of 25 wt % or less, and preferably 10 to 20 wt %, with respect to the entire hydrophilizing agent.

(1-4) Preparation of a Hydrophobic Porous Membrane Hydrophilizing Agent

The hydrophobic porous membrane hydrophilizing agent of the present invention is prepared by dissolving the above-mentioned surfactant in a solvent, either by itself or along with any optional additives. An example of how the surfactant is dissolved is to mix the components by a known mixing preparation method, such as using a propeller type stirrer. Components that are solids at normal temperature can be heated as necessary before mixing.

The hydrophobic porous membrane hydrophilizing agent of the present invention preferably contains the above-mentioned surfactant in an amount of 0.05 to 5 wt %, and even more preferably 0.05 to 1 wt %, with respect to the entire hydrophobic porous membrane hydrophilizing agent. Keeping the surfactant content to 0.05 wt % or higher tends to contribute to excellent characteristics as a hydrophilizing agent, while keeping the surfactant content to 5 wt % or less tends to reduce the amount of elution from the membrane and lower the COD.

(2) Membrane Module

The hydrophobic porous membrane hydrophilizing agent of the present invention is used to hydrophilize a hydrophobic porous membrane in a membrane module. Any of various types of membrane module can be used, such as a flat membrane type, cylindrical type, pleated type, or hollow fiber type.

(2-1) Structure of Membrane Module

The membrane module has a main body, an inlet, an outlet, and a porous membrane. More specifically, the inlet and outlet are provided to the membrane module main body, and the porous membrane is provided inside the main body. The inlet and outlet may be provided to the two ends of the main body (a type that is linear and open at both ends), or either the inlet or the outlet may be opened large (a type that is linear and open on one side). The porous membrane is linked to the inside of the main body so as to divide the main body into to a first chamber having an inlet and a second chamber having an outlet. This linking includes adhesive bonding or sealing of the ends of the porous membrane to the inner walls of the main body, or the ends of the porous membrane may be detachably connected to the main body inner walls. Therefore, the membrane module of the present invention has a structure with which a liquid or gas that has been introduced through the inlet enters the main body, constantly passes through the porous membrane, and is discharged through the outlet.

The inlet, outlet, and main body of the membrane module of the present invention may be made of stainless steel, [ordinary] steel, or another such metal, or of a fluororesin, ABS resin, polyolefin resin, vinyl chloride resin, or other such resin.

(2-2) Hydrophobic Porous Membrane

The hydrophobic porous membrane of the present invention can be any porous membrane as long as it is a porous membrane that is hydrophobic. Examples of the shape of the hydrophobic porous membrane of the present invention include a flat membrane, a hollow fiber membrane, a tubular membrane, and a spiral membrane. The hydrophobic porous membrane of the present invention may also be a microfiltration membrane (MF), an ultrafiltration membrane (UF), a nanofiltration membrane (NF), or another such separation membrane.

The hydrophobic porous membrane of the present invention can be formed from any of various materials, as long as the material can be formed in the shape of a separation membrane, such as a material based on cellulose, polyolefin, polyvinyl alcohol, polysulfone, polyacrylonitrile, or a fluororesin. Examples include polyethylene, polypropylene, polyvinylidene fluoride, polytetrafluoroethylene, and polysulfone. The use of a highly hydrophobic resin is particularly favorable in terms of the surface characteristics of the hydrophobic porous membrane, and a fluororesin is especially good. Among fluororesins, it is even better to use a vinylidene fluoride resin because of its good chemical resistance and because it can be easily shaped into a film. Examples of vinylidene fluoride resins here include a homopolymer of vinylidene fluoride, as well as a copolymer of vinylidene fluoride and a monomer that can be copolymerized with vinylidene fluoride. Examples of the above-mentioned copolymerizable monomers include vinyl fluoride, tetrafluoroethylene, trifluoroethylene, and hexafluoropropylene.

The hydrophobic porous membrane of the present invention has a plurality of pores. These pores are preferably continuous pores that go all the way through the front and back sides of the hydrophobic porous membrane. The pore diameter can be selected as dictated by the intended application, but a suitable range, for example, is 0.01 to 5 μm, and preferably 0.1 to 1 μM. It is also preferable for the hydrophobic porous membrane of the present invention to have an asymmetric structure in which the pore diameter is small on one side of the hydrophobic porous membrane and large on the other side. In the case of an asymmetric structure, it is favorable for the pore diameter on one side to be more than 1 time and not more than 100 times, and preferably from 2 to 10 times, the pore diameter on the other side.

If the hydrophobic porous membrane is a hollow fiber membrane, the outside diameter of the hollow fiber is, for example, 0.1 to 10 mm, and preferably 0.5 to 5 mm. It is favorable for the hydrophobic porous membrane of the present invention to have a pure water permeation coefficient, which indicates the liquid permeation performance with respect to pure water, of 10 to 250 m$^3$/m$^2$/hr/MPa, and preferably 20 to 150 m$^3$/m$^2$/hr/MPa. The pure water permeation coefficient can be calculated from the following equation.

$$\text{Pure water permeation coefficient} = \{\text{amount of pure water permeation (m}^3)\}/\{\text{surface area of porous membrane (m}^2)\}/\{\text{permeation time (hr)}\}/\{\text{pressure of pure water (MPa)}\}$$

(3) Method for Hydrophilizing Hydrophobic Porous Membrane

There are normally cases when the surface of a hydrophobic porous membrane comes into contact with the air and is in a dry state, such as when the porous membrane is used for the first time, when the membrane is replaced, when the membrane is washed with a chemical, or when the membrane is not used for an extended period. In such cases, if the membrane is immersed again in the liquid to be treated (treatment liquid) or the like and an attempt is made to filter the treatment liquid, liquid permeation performance will suffer and the membrane will be unable to perform its original function as a separation membrane. Therefore, a membrane with both good fouling resistance and enhanced liquid permeability can be obtained by passing the treatment liquid through the membrane after first hydrophilizing the pores of the hydrophobic porous membrane. In terms of eliminating the inefficiency of recovering treated liquid as waste liquid, being able to use the hydrophobic porous membrane sooner, and so forth, it is preferable for the hydrophilizing agent to be quickly removed by passing a liquid through the hydrophobic porous membrane.

The hydrophilization of the hydrophobic porous membrane here includes bringing the hydrophobic porous membrane into contact with the above-mentioned hydrophobic porous membrane hydrophilizing agent. An example of hydrophilizing a hydrophobic porous membrane in a membrane module will now be described.

A hydrophilization treatment using the hydrophobic porous membrane of the present invention in a membrane module is conducted by injecting the above-mentioned hydrophobic porous membrane hydrophilizing agent from the side of the hydrophobic porous membrane facing the second chamber having the outlet. If there are two or more outlets, then (a) the hydrophobic porous membrane hydrophilizing agent may be injected through all of the outlets, or (b) the hydrophobic porous membrane hydrophilizing agent may be injected through one or more of the outlets, and any extra hydrophobic porous membrane hydrophilizing agent may be discharged through the remaining outlets.

(a) When the hydrophobic porous membrane hydrophilizing agent is injected through all of the outlets, any gas that has collected in the outlets or the second chamber provided with the outlets is pushed by the hydrophobic porous membrane hydrophilizing agent into the first chamber provided with an inlet. As a result, the hydrophobic porous membrane is gradually hydrophilized from the second chamber side toward the first chamber side.

(b) When the hydrophobic porous membrane hydrophilizing agent is injected through one or more of the outlets, and any extra hydrophobic porous membrane hydrophilizing agent is discharged through the remaining outlets, any gas that has collected in the outlets or the second chamber provided with the outlets can be pushed from one outlet to another outlet by the hydrophobic porous membrane hydrophilizing agent.

A hollow fiber membrane module is particularly prone to the collection of bubbles because of its complex structure.

If all of the inlets and outlets of a membrane module installed in a treatment water tank have a structure that is less likely to create areas of collection of air or the like above the water surface in the above-mentioned water tank, then any bubbles inside the membrane module can be allowed to escape, and the entire membrane module filled with hydrophilizing agent, by using a pump or the like to push the hydrophilizing agent in from the outlet at a specific pressure and flux.

However, if at least one part of the water collection component of the membrane module installed in the treatment water tank is below the membrane module, then it is preferable to employ a method in which a pump or the like is used to push the hydrophilizing agent in from the water collection component below the membrane module, push any gas remaining inside the membrane module and inside the piping out from the water collection component located above the membrane module, replace the bubbles with hydrophilizing agent, and thereby fill the entire membrane module with hydrophilizing agent.

A good hydrophilization treatment can be carried out with either (a) or (b) above, but from the standpoint of creating a structure that facilitates routing of the piping provided to the membrane module outlet when hydrophilization is performed, it is preferable to use method (a), in which the hydrophobic porous membrane hydrophilizing agent is injected through all of the outlets.

When the concentration of surfactant is 0.3 wt %, the flow amount of the hydrophobic porous membrane hydrophilizing agent of the present invention here is, for example, 0.5 to 5 liters, and preferably 2 to 3 liters, per square meter of membrane surface area. If the flow amount is at least 0.5 liter per square meter of membrane surface area, the hydrophilization of the membrane can be expected to have an adequate effect. Also, if the flow amount is no more than 5 liters per square meter of membrane surface area, the membrane separation will not be subjected to excessive load.

The injection rate of the hydrophobic porous membrane hydrophilizing agent is, for example, from 0.005 to 3 $m^3/m^2 \cdot D$, and preferably 0.01 to 0.3 $m^3/m^2 \cdot D$, per unit of membrane surface area. If the injection rate is no more than 3 $m^3/m^2 \cdot D$, the entire membrane surface can be uniformly hydrophilized, and if it is at least 0.005 $m^3/m^2 \cdot D$, the hydrophilization treatment can be carried out more quickly.

The adhesion proportion of hydrophobic porous membrane hydrophilizing agent that adheres to the hydrophobic porous membrane is, for example, 0.01 to 1.0 wt %, and preferably 0.05 to 0.5 wt %. This adhesion proportion can be found by measuring the weight ($W_0$) (g) of the hydrophobic porous membrane prior to the hydrophilization treatment, and the weight ($W_1$) (g) of the hydrophobic porous membrane after it has undergone hydrophilization treatment and been dried, and then calculating from the following equation.

$$\text{Adhesion proportion (\%)} = \{(W_1(g) - W_0(g))/W_0(g)\} \times 100$$

The hydrophilicity will be good if the adhesion proportion is at least 0.01 wt %, but the adhesion proportion is preferably no more than 1.0 wt % so that no extra hydrophobic porous membrane hydrophilizing agent will be included in the membrane module.

The temperature of the hydrophobic porous membrane hydrophilizing agent of the present invention during hydrophilization is, for example, from 10 to 50° C., and preferably 20 to 30° C. If the temperature is 10° C. or higher, there will be no decrease in the hydrophilization rate and permeation performance will be enhanced because the hydrophilization treatment is performed more thoroughly. If the temperature is 50° C. or lower, there will be no decrease in permeation performance due to thermal degradation of the hydrophilizing agent or to heat shrinkage of the membrane. The hydrophilizing agent may be recovered immediately after the injection of the hydrophobic porous membrane hydrophilizing agent, but the immersion time in the hydrophobic porous membrane hydrophilizing agent is at least 30 seconds, and allowing the hydrophobic porous membrane to soak in the hydrophobic porous membrane hydrophilizing agent for 10 to 120 minutes, and preferably 30 to 90 minutes, is even better because the hydrophilization will be more complete and permeation performance will be enhanced.

The hydrophobic porous membrane hydrophilizing agent of the present invention that is contained in the membrane module can be suitably recovered after the hydrophilization treatment by tilting the membrane module, for example, and thereby discharging any extra hydrophilizing agent contained in the module. The hydrophobic porous membrane hydrophilizing agent can be pushed out by allowing water or the liquid to be treated to flow from the first chamber side having the inlet to the second chamber side having the outlet. This further improves the efficiency of hydrophilizing the membrane, and also cuts down on the work entailed by recovery. The water used for this purpose is preferably pure water, refined water, or other such water that is clean enough not to foul the second chamber side having the outlet. It is even more favorable to use bactericidal liquid such as a sodium hypochlorite aqueous solution. This may also be water obtained by filtering ordinary tap water or deionized water through a hollow fiber membrane with a pore size of 0.01 to 1 μm.

The method of the present invention for hydrophilizing a hydrophobic porous membrane will be described in further detail through reference to FIG. 1.

FIG. 1 is a simplified diagram of a membrane separation apparatus including the membrane module of the present invention. The example here is a membrane separation apparatus for the treatment of a liquid to be treated (treatment liquid), which contains organic matter, for example, with microbes and a separation membrane. The treatment liquid 3 is first introduced into a membrane separation tank 1, and treated with microbes in the membrane separation tank 1. The organic matter here usually includes proteins, amino acids, sugars, lipids, or other biodegradable substances, and this organic matter can be significantly removed with microbes and the membrane module of the present invention. These microbes can be those contained in active sludge or the like, or those used in a bioreactor for producing useful substances. In this microbial treatment, air is blown from a diffuser pipe 4 into the membrane separation tank 1. This liquid treated with the microbes is treated as it passes through a hydrophobic porous membrane (not shown) in a membrane module 2, and this treated liquid is discharged through a pipe 5.

When the hydrophobic porous membrane of the present invention is hydrophilized, first a hydrophobic porous membrane hydrophilizing agent is introduced from the pipe 5 side into the hydrophobic porous membrane (not shown) in the membrane module 2. If there are a plurality of outlets in the membrane module 2, excess hydrophobic porous membrane hydrophilizing agent may be discharged from one outlet into the membrane separation tank 1. After this, the hydrophobic porous membrane hydrophilizing agent is held for a specific length of time in the hydrophobic porous membrane. After this time has elapsed, fresh water is introduced from the pipe 5 side into the hydrophobic porous membrane (not shown) in the membrane module 2, to replace the hydrophobic porous membrane hydrophilizing agent with water. In this replacement, air may be blown from the diffuser pipe 4 into the membrane separation tank 1. As a result, hydrophilization is carried out, and the concentration of hydrophobic porous membrane hydrophilizing agent contained in the initial flow of treatment liquid after the hydrophilization treatment can be suitably lowered.

Thus, with the hydrophilization method of the present invention, in which a hydrophobic porous membrane hydrophilizing agent that is an aqueous solution of a surfactant with low frothing is injected from a treatment liquid side, even if at least a part of the hydrophobic porous membrane should dry out have diminished permeation performance (membrane flux), restoring the membrane flux will entail less hydrophilizing agent, labor, time, and expense. Also, since a surfactant with low frothing is used, even if some of the surfactant should flow into the membrane separation tank 1 as a result of the hydrophilization treatment, and gas is subsequently bubbled from the diffuser pipe 4, foaming by the surfactant can be kept to a minimum, and no bubbles or treatment liquid 3 will leak out from the membrane separation tank 1. Furthermore, since the hydrophobic porous membrane hydrophilizing agent can be replaced by flushing with a small amount of water after the hydrophilization treatment, admixture of the hydrophobic porous membrane hydrophilizing agent into the treatment liquid can be suppressed, so the membrane separation apparatus can be put back in operation more smoothly. In addition, with a conventional hydrophilization method in which ethanol or the like is used, the ethanol may flow into the membrane separation tank 1 and raise the solubility COD inside the membrane separation tank 1, which makes it more difficult to put the membrane separation apparatus back in operation smoothly, but with the hydrophobic porous membrane hydrophilizing agent of the present invention, the increase in the solubility COD inside the membrane separation tank 1 can be suppressed. A known method can be used to measure COD, but an example is to measure the absorbancy as set forth in JIS K 0102. For example, when water is passed through the porous membrane at an injection rate of 0.01 $m^3/m^2 \cdot D$ per unit of surface area, it is favorable if the COD value becomes the value prior to hydrophilization treatment within 5 days, and preferably within 4 days.

(4) Method for Testing and Hydrophilizing Membrane Module (4-1) Method for Testing Membrane Module As mentioned above, a membrane module usually has a main body, an inlet, an outlet, and a porous membrane, and the porous membrane is linked to the inside of the main body so as to divide the main body into to a first chamber having an inlet and a second chamber having an outlet. However, if there should be any defects (such as holes, cracks, incomplete linkage, or clogging of the porous membrane) in the linked portion between the porous membrane and the main body interior, or in the members themselves (the main body, inlet, outlet, porous membrane, etc.), this membrane module will not function as intended. Therefore, a test for these defects must be conducted.

What is called the "bubble point method" is a typical way to test a product. This method was originally developed for the purpose of evaluating pore size, but because of its simplicity, it is often used today in the completeness testing of microfiltration membranes and ultrafiltration membranes. This method is described in JIS K 3832, "Bubble Point Test Method for Microfiltration Membrane Elements and Modules."

In specific terms, the method of the present invention for testing a membrane module comprises the steps of:

(1) immersing a membrane module in the hydrophobic porous membrane hydrophilizing agent of the present invention;

(2) introducing a test gas through an inlet, passing it through the hydrophobic porous membrane, and discharging it through an outlet; and (3) observing bubbles discharged from the membrane module.

Preferably, step (2) is conducted by:

(i) introducing the test gas through the inlet of the membrane module while everything beyond the outlet is closed off;

(ii) gradually pressurizing the test gas;

(iii) using the pressurized test gas to push water out of the pores in the hydrophobic porous membrane; and (iv) discharging the test gas out through the hydrophobic porous membrane.

If the membrane is damaged or has a large hole in it, air will begin to permeate at a far lower pressure than expected, and it is from this that a defect in the membrane is detected.

The hydrophobic porous membrane hydrophilizing agent in which the membrane module is immersed here contains the above-mentioned low-frothing surfactant of the present invention, any desired solvent, and so forth. The test gas may be introduced as soon as the membrane module is immersed, but it is preferable to leave the membrane module soaking for a specific length of time because the hydrophilization will be more complete. The immersion time of the membrane module is from 30 seconds to 30 minutes, for example, and preferably from 5 to 20 minutes.

Air, nitrogen, argon, or another such inert gas, or the like can be used as the test gas. According to JIS K 3832, "Bubble Point Test Method for Microfiltration Membrane Elements and Modules," the test is conducted by gradually introducing the test gas up to the target pressure, ranging between 5 kPa and 1 MPa. If a large area is being sought, such as a defect in a potted portion, for example, it can be found at a relatively low pressure, so the pressurization range may be about 10 to 100 kPa.

The test gas introduced into the membrane module is discharged from the outlet, but the end of the outlet may be closed to conduct a defect test of the connected portions of the inlet, outlet, main body, and so forth. The test gas is introduced into the membrane module, and the module is visually observed to look for bubbles released from the membrane module as a whole or from its inlet, outlet, or main body, bubbles released from the connected portions between the various components, and bubbles released from the hydrophobic porous membrane and the portion where it is connected to the main body.

If a liquid with low surface tension is used, the same defect location detection will be possible at a lower measured pressure value than with pure water, so this also improves incidental effects such as being able to conduct the test in a form that leaves no pressure load hysteresis in the membrane module.

Thus, if the defect test is conducted in the hydrophobic porous membrane hydrophilizing agent of the present invention, passage of the test gas will dry the hydrophobic porous membrane less and render it less hydrophobic, and the decrease in permeation performance that would accompany higher hydrophobicity can be suppressed. This is because when the test gas is passed through the membrane, contact with the hydrophobic porous membrane hydrophilizing agent of the present invention results in the hydrophobic porous membrane being spontaneously wetted with water. Also, because the low-frothing surfactant of the present invention is used, any bubbles produced from defect portions will collect on the water surface, so there will be no difficulty in locating the defects. In other words, when a low-frothing surfactant is used, even if a test gas is introduced from inside the membrane module, there will be no foaming of the solution in which the membrane module is immersed, and even if there should be a tiny amount of foaming, the bubbles will burst right away, so the test can be carried out continuously.

Furthermore, this configuration avoids the problems such as solvent storage encountered when a hydrophilizing agent such as glycerol-polyethylene glycol-alcohol.

(4-2) Method for Testing and Hydrophilizing Membrane Module

After the bubbles are observed and the defect test is conducted as above, a step (4) of drying the membrane module may be further conducted, and the membrane module subjected to a hydrophilization treatment. This hydrophilization treatment is mainly conducted by immersing the membrane module from the above-mentioned step (1) in the hydrophobic porous membrane hydrophilizing agent of the present invention, but if drying is performed in step (4) after this, the product can be distributed in a dry state in which the surface of the hydrophobic porous membrane has been hydrophilized, the treatment liquid can be passed through at a high level of permeation performance without further performing a hydrophilization treatment at the time of use, it will be possible to provide a membrane module product with which the initial flow of treatment liquid recovered as waste is kept to a minimum. Also, since the hydrophobic porous membrane hydrophilizing agent of the present invention has a low-frothing property, the above-mentioned defect test and the hydrophilization treatment can be carried out simultaneously.

The drying temperature after the defect test is, for example, from 20 to 120° C., and preferably 30 to 60° C. Sufficiently high permeation performance can be imparted as long as the drying temperature is at least 20° C., and the heat shrinkage of the hydrophobic porous membrane and a decrease in permeation performance due to thermal degradation of the hydrophobic porous membrane hydrophilizing agent of the present invention can be suppressed as long as the temperature is 120° C. or lower.

WORKING EXAMPLES

Working Example 1

A 0.3 wt % aqueous solution of an acetylene glycol-based surfactant (Olfine EXP4036, made by Nissin Chemical Industry) (this aqueous solution had a static surface tension of 25.8 mN/m, or 27.1 mN/m when converted to the static surface tension for a 0.1 wt % aqueous solution) was used as the hydrophobic porous membrane hydrophilizing agent of the present invention.

Comparative Example 1

A 40 wt % glycerol aqueous solution (containing 15 wt % EtOH) was used as a hydrophilizing agent.

Comparative Example 2

A 1.0 wt % aqueous solution of Emulgen LS-106.1, a higher alcohol-based ether-type nonionic surfactant (made by Kao; surface tension of 29.5 mN/m) was used as a hydrophilizing agent.

Comparative Example 3

A 30% aqueous solution of ethanol (Wako Pure Chemicals, extra pure reagent, 99.5%) was used as a hydrophilizing agent.

Porous Membrane 1

A membrane composed of a hollow fiber membrane (made by Mitsubishi Rayon) made of a vinylidene fluoride resin and having an outside diameter of 2.4 mm, a pore size of 0.4 µm, and a pure water permeation coefficient of 100 $m^3/m^2/hr/MPa$ was prepared as a hydrophobic porous membrane.

Porous Membrane 2

A membrane composed of a hollow fiber membrane (made by Mitsubishi Rayon) made of a polyethylene resin and having an outside diameter of 0.54 mm, a pore size of 0.4 µm, and a pure water permeation coefficient of 30 $m^3/m^2/hr/MPa$ was prepared as a hydrophobic porous membrane.

Membrane Module

A plurality of the above-mentioned porous membranes 1 were bundled to produce a membrane module having a membrane surface area of 4.4 $m^2$.

(1) Frothing Test

The hydrophobic porous membrane hydrophilizing agent of Working Example 1 was subjected to a frothing test by the Ross-Miles method. This test was conducted as set forth in JIS K 3362. Water was added to the aqueous solution of the hydrophobic porous membrane hydrophilizing agent in Working Example 1 to produce a 0.1 wt % aqueous solution. After this, the bubble height was measured at 25° C., both immediately after frothing and 5 minutes after frothing.

Also, the surfactant of Comparative Example 2 was subjected to the same frothing test by the Ross-Miles method.

The results are given in Table 1 below.

TABLE 1

| | Bubble height immediately after frothing | Bubble height 5 minutes after frothing |
|---|---|---|
| Working Example 1 | 27 mm | ≦10 mm |
| Compar. Example 2 | 87 mm | 48 mm |

(2) Defect Test

Test 1

Porous membrane 1 was immersed for 10 minutes in the hydrophobic porous membrane hydrophilizing agent of Working Example 1, after which pressurized air (50 kPa) was introduced through the inlet of the membrane module, and the outlet and inlet were blocked off and sealed. Frothing occurred from defect portions of the membrane module, but because the bubbles thus produced burst right away, this did not hinder finding the defect points, and continuing the defect test was easy.

Test 2

A membrane module was tested in the same manner as in Test 1, except that porous membrane 2 was used instead of porous membrane 1. Frothing occurred from defect portions of the membrane module, but because the bubbles thus produced burst right away, this did not hinder finding the defect points, and continuing the defect test was easy.

Comparative Test 1

A membrane module was tested in the same manner as in Test 1, except that it was immersed for 30 minutes in the surfactant of Comparative Example 2 instead of being immersed for 10 minutes in the hydrophobic porous membrane hydrophilizing agent of Working Example 1. The bubbles produced from defect portions of the membrane module foamed on the water surface, and these bubbles tended to remain without bursting on the water surface. This made the defect test difficult.

(3) Hydrophilicity and COD Test

Test 1

A porous membrane 1 that was free of defects was immersed for 10 minutes in the hydrophobic porous membrane hydrophilizing agent of Working Example 1 and subjected to a hydrophilization treatment. After this, the porous membrane 1 was dried for 4 hours at 50° C., and its pure water permeation coefficient in water was measured. The pure water permeation coefficient was calculated from the following equation.

Pure water permeation coefficient={amount of pure water permeation (m³)}/{surface area of porous membrane (m²)}/{permeation time (hr)}/{pressure of pure water (MPa)}

Also, to measure the amount of elution of the hydrophobic porous membrane hydrophilizing agent from the hydrophobic porous membrane, water was passed through the membrane module at a pressure of 0.1 MPa, and the $COD_{Mn}$ value in the membrane filtration water 30 minutes after the start of water passage was found. $COD_{Mn}$ was measured in the present invention by using an absorbancy type of $COD_{Mn}$ measurement set (made by Central Kagaku) according to JIS method (JIS K 0102).

Test 2

A porous membrane 2 that was free of defects was immersed for 10 minutes in the hydrophobic porous membrane hydrophilizing agent of Working Example 1 and subjected to a hydrophilization treatment. After this, the porous membrane 2 was dried for 4 hours at 50° C. and its pure water permeation coefficient in water was measured in the same manner as in Test 1.

Comparative Test 1

A porous membrane 1 that was free of defects and that had not undergone hydrophilization treatment was dried for 4 hours at 50° C. After this, pure water permeation coefficient in water was measured.

Comparative Test 2

A porous membrane 1 that was free of defects was immersed for 10 seconds the 40 wt % glycerol aqueous solution of Comparative Example 1 and subjected to a hydrophilization treatment. After this, the porous membrane 1 was dried for 4 hours at 50° C. and its pure water permeation coefficient in water was measured in the same manner as in Test 1. Water was passed through the membrane module at a pressure of 0.1 MPa, and the $COD_{Mn}$ value 30 minutes after the start of water passage was measured.

Comparative Test 3

A porous membrane 1 that was free of defects was immersed for 10 minutes in the surfactant aqueous solution of Comparative Example 2 and subjected to a hydrophilization treatment. After this, the porous membrane 1 was dried for 4 hours at 50° C. and its pure water permeation coefficient in water was measured in the same manner as in Test 1.

The results are given in Table 2 below.

TABLE 2

| | Porous membrane | Hydro-philizing agent | Pure water permeation coefficient (m³/m²/hr/MPa) | | $COD_{Mn}$ value (mg/liter) |
|---|---|---|---|---|---|
| | | | Before drying | After drying | |
| Test 1 | porous membrane 1 | Working Example 1 | 100 | 96 | ≦10 |
| Test 2 | porous membrane 2 | Working Example 1 | 30 | 28 | ≦10 |
| Comp. Test 1 | porous membrane 1 | none | 100 | 5 | 0 |
| Comp. Test 2 | porous membrane 1 | Comp. Example 1 | 100 | 93 | 2200 |
| Comp. Test 3 | porous membrane 1 | Comp. Example 2 | 100 | 85 | 50 |

Test 1 and Comparative Test 2 indicated about the same pure water permeation coefficient as when hydrophilization and water replacement were performed with ethanol (30% aqueous solution). However, the amount of glycerol elution was larger in Comparative Test 2.

(4) Hydrophilization Test of Hydrophobic Porous Membrane in Membrane Separation Apparatus Test 3

The membrane separation tank 1 of a membrane separation apparatus having a 0.7 m³ membrane separation tank 1 was filled with ordinary household wastewater, before and after treatment such as condensation settling, as the treatment liquid 3. Active sludge was added as microbes to the membrane separation tank 1.

The membrane module 2 was immersed and installed in the membrane separation tank 1, and the hydrophobic porous membrane hydrophilizing agent of Working Example 1 was injected from the pipe 5 into the membrane module 2 in an amount of 2 liters per square meter of membrane surface area and at an injection rate of 0.01 m³/m²·D per unit of surface area. Upon completion of the injection, the membrane module was allowed to stand for 60 minutes and hydrophilization treatment was performed. Water that had been filtered through a hollow fiber membrane (pore size of 0.1 µm) was injected from the pipe 5 into the membrane module 2 in an amount of 2 liters per square meter of membrane surface area and at an injection rate of 0.01 m³/m²·D per unit of surface area to push the hydrophobic porous membrane hydrophilizing agent of Working Example 1 into the membrane separation tank 1. After the hydrophilization treatment, air was immediately introduced through the diffuser pipe 4 to discharge the treatment liquid from the pipe 5, and the operation of the membrane separation apparatus was commenced. One week later the pure water permeation coefficient of the hydrophobic porous membrane and the $COD_{Mn}$ value of the treated liquid were measured.

These results are given in Table 3 below.

TABLE 3

| Test 3 | Pure water permeation coefficient (m³/m²/hr/MPa) | $COD_{Mn}$ value (mg/liter) |
|---|---|---|
| before hydrophilization treatment | 100 | 12.0 |

TABLE 3-continued

| Test 3 | Pure water permeation coefficient (m³/m²/hr/MPa) | COD$_{Mn}$ value (mg/liter) |
|---|---|---|
| after 0 minutes | 98 | 89.3 |
| after 1 hour | 100 | 16.3 |
| after 24 hours | 99 | 13.6 |
| after 2 days | 100 | 13.5 |
| after 3 days | 97 | 12.3 |
| after 4 days | 100 | 11.8 |
| after 5 days | 100 | 11.8 |
| after 6 days | 100 | 12.0 |
| after 7 days | 97 | 11.3 |

It was confirmed that over the course of 1 week after the hydrophilization treatment, there was no sudden decrease in the pure water permeation coefficient, and the hydrophilization treatment was being sufficiently carried out. Also, it was possible for smooth operation to continue from immediately after the hydrophilization treatment, without the treatment liquid 3 foaming, or the bubbles and treatment liquid 3 overflowing from the membrane separation tank 1 due to aeration from the diffuser pipe 4.

The COD$_{Mn}$ value of the treated liquid was seen to rise about 4 mg/liter in the initial flow after 15 minutes, as compared to before the hydrophilization treatment, but 24 hours after operation had commenced, the COD$_{Mn}$ value had decreased to the same level as that prior to the hydrophilization treatment.

Comparative Test 4

The pure water permeation coefficient of the hydrophobic porous membrane and the COD$_{Mn}$ value of the treated liquid were measured in the same manner as in Test 3, except that the 40 wt % glycerol aqueous solution of Comparative Example 1 was injected from the pipe 5 into the membrane module 2.

These results are given in Table 4 below.

TABLE 4

| Comparative Test 4 | Pure water permeation coefficient (m³/m²/hr/MPa) | COD$_{Mn}$ value (mg/liter) |
|---|---|---|
| before hydrophilization treatment | 100 | 11 |
| after 0 minutes | 98 | 15,700 |
| after 1 hour | 100 | 2,200 |
| after 24 hours | 99 | 450 |
| after 2 days | 100 | 120 |
| after 3 days | 97 | 70 |
| after 4 days | 100 | 35 |
| after 5 days | 100 | 18 |
| after 6 days | 100 | 12.5 |
| after 7 days | 97 | 11.0 |

The COD$_{Mn}$ value of the treated liquid was seen to rise about 2189 mg/liter in the initial flow after 1 hour, as compared to before the hydrophilization treatment. The treated liquid at the start of operation, including the initial flow, had to be considered waste. Even 24 hours after the start of operation, the concentration was higher than before the hydrophilization treatment, and after 5 days the COD$_{Mn}$ value decreased to the level prior to addition.

Comparative Test 5

The pure water permeation coefficient of the hydrophobic porous membrane and the COD$_{Mn}$ value of the treated liquid were measured in the same manner as in Test 3, except that the ethanol aqueous solution of Comparative Example 3 was injected from the pipe 5 into the membrane module 2.

These results are given in Table 5 below.

TABLE 5

| Comparative Test 5 | Pure water permeation coefficient (m³/m²/hr/MPa) | COD$_{Mn}$ value (mg/liter) |
|---|---|---|
| before hydrophilization treatment | 100 | 12.0 |
| after 0 minutes | 98 | 1942.0 |
| after 1 hour | 100 | 105.8 |
| after 24 hours | 99 | 20.5 |
| after 2 days | 99 | 14.5 |
| after 3 days | 97 | 13.8 |
| after 4 days | 96.5 | 12.0 |
| after 5 days | 94.8 | 11.8 |
| after 6 days | 95.3 | 12.0 |
| after 7 days | 94.8 | 12.3 |

It was confirmed that over the course of 1 week after the hydrophilization treatment, there was no sudden decrease in the pure water permeation coefficient, and the hydrophilization treatment was being sufficiently carried out. Also, although there was slight foaming of the treatment liquid 3, it was possible for smooth operation to continue from immediately after the hydrophilization treatment, without bubbles and treatment liquid 3 overflowing from the membrane separation tank 1 due to aeration from the diffuser pipe 4.

The COD$_{Mn}$ value of the treated liquid was seen to rise about 1830 mg/liter in the initial flow after 0 minutes, as compared to before the hydrophilization treatment, so the treated liquid had to be considered waste. It took about 1 day for the ethanol to be biodegraded, and the apparatus could not be started up quickly after the hydrophilization treatment.

The invention claimed is:

1. A method for hydrophilizing a hydrophobic porous membrane, comprising a step of bringing a hydrophobic porous membrane into contact with the hydrophilizing agent for a hydrophobic porous membrane, wherein the agent contains ethoxylated acetylene glycol based surfactant having a static surface tension in the range of 20-28 mN/m in a 0.1% aqueous solution, and the surfactant has a frothability such that the bubble heigh immediately after frothing, as measured according to the Ross-Miles method (JIS K 3362), using a 0.1 wt. % aqueous solution of the surfactant at 25° C., is 40 mm or less.

2. The method for hydrophilizing a hydrophobic porous membrane according to claim 1, further comprising a step of drying the hydrophobic porous membrane that has come into contact with said hydrophilizing agent.

3. The method for hydrophilizing a hydrophobic porous membrane according to claim 1, wherein the adhesion proportion of the hydrophilizing agent is 0.01 to 1.0 wt %.

4. The method for hydrophilizing a hydrophobic porous membrane according to claim 1, wherein said ethoxylated acetylene glycol based surfactant is selected from the group of 2,4,7,9-tetramethyl-5-decyn-4,7-diol, 3,6-dimethyl-4-octyn-3,6-diol, and 3,5-dimethyl-1-hexyn-3-ol, 2,5,8,11-tetramethyl-6-dodecyn-5,8-diol.

5. The method for hydrophilizing a hydrophobic porous membrane according to claim 1, wherein the frothability is such that said bubble height is 30 mm or less.

6. The method for hydrophilizing a hydrophobic porous membrane according to claim 1, wherein the frothability is such that said bubble height is 20 mm or less.

7. The method for hydrophilizing a hydrophobic porous membrane according to claim 1, wherein the frothability is such that said bubble height is 15 mm or less.

* * * * *